United States Patent Office 3,482,692
Patented Dec. 9, 1969

3,482,692
ELUTRIATOR
Arlin K. Postma, Benton City, Wash., assignor to the United States of America as represented by the United States Atomic Energy Commission
Filed Oct. 2, 1968, Ser. No. 764,476
Int. Cl. B03d 3/00
U.S. Cl. 209—156            6 Claims

ABSTRACT OF THE DISCLOSURE

An elutriator and method for sizing particles according to their settling velocities. A carrier fluid is flowed horizontally through a series of screens which maintain a flat velocity profile. The feed, a mixture of particles and fluid less dense than the carrier fluid, is introduced at the top of the carrier fluid, and the particles are separated downstream according to their vertical position in the carrier fluid.

CONTRACTUAL ORIGIN OF THE INVENTION

The invention described herein was made in the course of, or under, a contract with the United States Atomic Energy Commission.

BACKGROUND OF THE INVENTION

This invention relates to a device and method for separating particles according to their settling velocities and, more particularly, this invention relates to a device and method for separating particles according to size.

In research on particulate material and, also, on aerosols, there is a need to separate particles according to size. At present, there are many devices and methods for sizing particles, but some are batch operations while others only separate a certain cut or range of particle sizes. The elutriator and method of this invention provide for continuous sizing of a wide range of particle sizes.

In a fluid, particles settle at a rate determined by their density, size and shape. For particles of the same shape and density, settling velocity is principally determined by size. Using the above principle a batch of uniformly shaped particles having the same density can be sized by introducing them into a horizotally moving fluid and separating them at a point downstream according to their vertical displacement. The largest particles have the largest vertical displacement. The inherent and required assumption is that all parts of the fluid are moving at the same velocity, because for a given horizontal distance, particles with the same settling velocities will have smaller vertical displacements in faster moving fluid than in slower moving fluid. It is this requirement of uniform velocity across the entire cross section of the carrier fluid which has heretofore prevented successful particle sizing based on the above mentioned principle.

In a moving fluid there is friction between the molecules which make up the fluid and the container walls so the fluid velocity at the container walls is less than in the center of the fluid. A velocity gradient or profile results in which the fluid velocity is not the same for the entire cross section of the fluid. The discovery which forms part of the basis of this invention is that foraminous material substantially normal to the fluid path at intervals from one end of the fluid path to the other will maintain a flat velocity profile from one end of the fluid stream to the other. A flat velocity profile means that all increments of the stream are moving at substantially the same velocity. From the above discussion, it should be clear that particles introduced at the top of a fluid moving with a flat velocity profile will settle according to their settling velocities, and if the particles are all the same shape and density, then their settling velocities will be determined by their size.

SUMMARY OF THE INVENTION

The device and method of this invention comprise an elongated housing provided with foraminous material vertically placed at intervals along the entire length of the housing. A carrier fluid is introduced into one end of the housing and a feed, which is a mixture of particles and a fluid less dense than the carrier fluid, is introduced at the top of the housing. Vertically spaced exit tubes at the other end of the housing provide for particle exit from the housing according to their vertical displacement.

DETAILED DESCRIPTION OF THE PREFERRED EMBODIMENT

Figure 1:
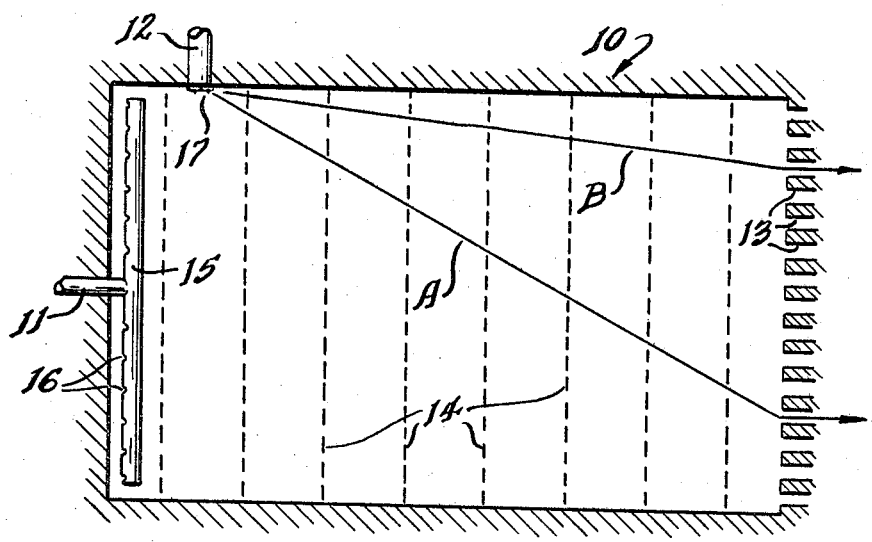
FIG. 1 is a schematic view from the side of the device of this invention.

With reference to FIG. 1, an elongated rectangular housing 10 has at one end a carrier fluid inlet 11 and a feed inlet 12 at the top of the housing proximate the carrier fluid inlet. At the other end of the housing 10 are a plurality of outlet tubes 13 vertically spaced one from another, each tube 13 extending across the entire width of the housing. Foraminous material 14 perpendicular to the longitudinal axis of housing 10 is spaced from one end of the housing to the other end. A perforated tube 15 also perpendicular to the longitudinal axis of housing 10 is intermediate the carrier fluid inlet 11 and the foraminous material 14 closest thereto. Perforations 16 in tube 15 face toward the fluid inlet 11. A screen 17 intersects feed inlet 12 where the inlet joins housing 10.

In operation, a carrier fluid is fed to housing 10 through inlet 11 and tube 15. The carrier fluid flows through perforations 16 in tube 15 and thereafter out of housing 10 via outlet tubes 13 to settling tanks (not shown). Feed enters housing 10 through feed inlet 12 and flows atop the carrier fluid through the uppermost outlet tubes 13. As shown in FIGURE 1, particles with greater settling velocities, line A, pass through an outlet tube 13 near the bottom of housing 10 while particles with smaller settling velocities, line B, pass through an outlet tube nearer the top of the housing.

The foraminous material 14 may be screens from about 30 mesh to much smaller openings such as 80 or 100 mesh. The mesh size is determined by the size of the particles in the feed. If the particles are large and the screen openings too small, then the screens may filter the particles from the feed. Obviously this is undesirable. The screens must have small enough openings to flatten the velocity profile of the carrier fluid yet large enough not to filter the particles.

The feed fluid is lighter in density than the carrier fluid to prevent mixing at feed inlet 12 which would affect the particle sizing by carrying particles into the carrier fluid instead of depositing them on top of the carrier fluid. To this end, feed inlet 12 may be rotated so that the feed flows tangentially to the carrier fluid. Screen 17 inhibits turbulence of the feed and helps to flatten any velocity profile present in the feed stream. Where the carrier fluid is water and the feed is comprised of water and particles, the density differential may be accomplished by maintaining the feed a few degrees centigrade higher than the carrier fluid. The density differential may also be achieved by use of nonidentical but miscible fluids such as alcohol and water or by immiscible fluids such as carbon tetrachloride and water. Immiscible fluids may be used provided the surface tension at the interface does not inhibit particle movement from the feed to the carrier fluid. But, if the system is recirculating, the first-named alternative of identical fluids at different temperatures is preferred.

Several experiments were conducted to demonstrate the effectiveness of the invention. In all the experiments the carrier fluid was water, the feed was a suspension of glass beads in water and the screens were 50 mesh. All the beads were spherical and of the same density. The feed was maintained about three or four degrees centigrade warmer than the carrier fluid. The housing 10 used in these experiments was about 4 feet long from inlet 11 to outlet 13 and about 3 feet in height. The screens 14 were spaced about 5 inches apart and were about 3 feet in height and about 1 inch in width. The housing 10 was also about 1 inch in width (internal measurement).

In some experiments dye was injected into the feed. In no case did the dye mix with the carrier fluid to any significant degree. The two streams, the carrier fluid and the feed, remained substantially separate from one end of housing 10 to the other.

In other experiments dye was injected into the carrier fluid. The carrier fluid velocity was adjusted to about ½ foot per minute and the velocity profile of the carrier fluid observed. As the dye front, which was a vertical line, passed through each screen 14, the front became essentially straight or flat. In between each screen 14 the front started to form a curved profile.

Experiments were also conducted to determine if particle sizing could be accomplished without having screens the entire length of the housing. In these experiments the screens 14 near outlet tubes 13 were removed while other conditions remained the same. Particle sizing was substantially inferior without the screens 14 because a normal velocity profile developed which inhibited sizing according to settling velocities.

Figure 2:
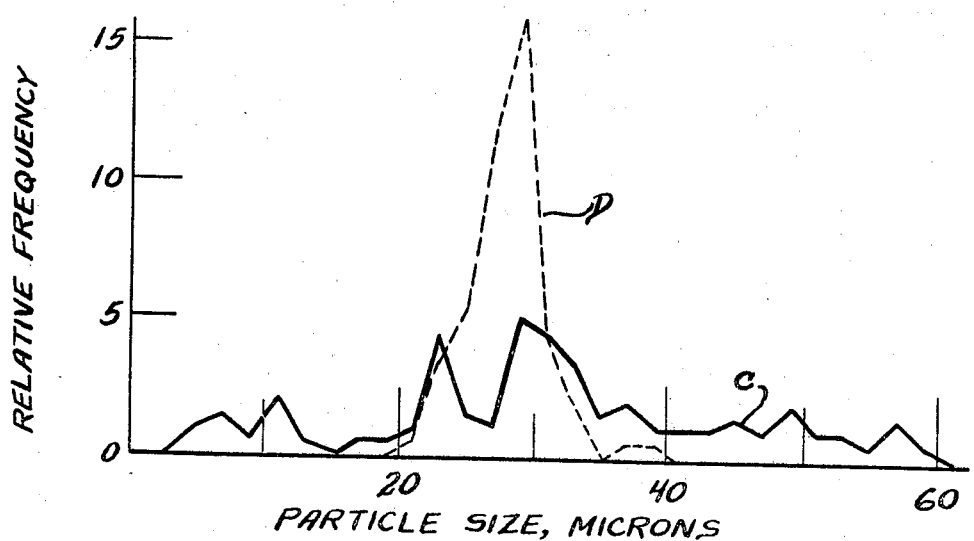
FIG. 2 is a graph showing the relationship between the particle size distribution in the feed and the particle size distribution in one outlet stream.

Experiments were also performed with all screens 14 in place and with feed comprised of water and beads from about 5 to 60 microns. FIGURE 2 shows the relationship of the size distribution of the feed, line C, and the size distribution of the center outlet tube 13, line D. It is clear from the figure that the vast majority of particles in the center outlet tube 13 were between 20 and 35 microns. While in the experiments, the outlet tubes 13 were equally spaced, they may be arranged according to the size distribution desired.

From the foregoing it is apparent that while a certain screen fineness is necessary to maintain a substantially flat velocity profile only the particle size determines how fine the screens may be. Also, while screens of uniform mesh were used in the experiments, various mesh sizes could be used if they were all 30 mesh or finer.

It will be understood that the invention is not to be limited to the details given herein but that it may be modified within the scope of the appended claims.

The embodiments of the invention in which an exclusive property or privilege is claimed are defined as follows:

1. A device for separating particles according to their settling velocities comprising an elongated housing having at one end a liquid inlet;
   a particle inlet at the top of the housing proximate the liquid inlet;
   means for admitting a carrier liquid into the housing from the liquid inlet and means for maintaining a flat velocity profile for the carrier liquid as it traverses the entire housing comprising a plurality of screens having openings therein which are large with respect to the size of the particles being separated disposed normal to the flow of carrier liquid and extending completely across the housing, said screens being spaced at approximately equal intervals the entire length of the housing, the spacing being such that the screens flatten the velocity profile of the carrier liquid the entire length of the housing; and
   a plurality of vertically spaced outlets at the other end of the housing.

2. The device of claim 1 wherein the screens are substantially the same fineness and are about 30 mesh or finer.

3. The device of claim 1 wherein the means for admitting a carrier liquid into the housing from the liquid inlet comprises a perforated tube perpendicular to the longitudinal axis of the housing and intermediate the liquid inlet and the screen closest thereto, said perforations facing the liquid inlet.

4. A process of separating particles according to their settling velocity comprising establishing and maintaining a horizontal flow of carrier liquid;
   maintaining substantially constant velocity across substantially the entire cross-sectional area of the carrier liquid for substantially the entire length of the flow path;
introducing particles at the top of the carrier liquid; and
   removing the particles from the flow path according to their vertical position in the path at a point downstream from their introduction therein.

5. The process of claim 4 wherein the particles are introduced at the top of the carrier liquid in a liquid of lower density than is the carrier liquid.

6. The process of claim 5 wherein the carrier liquid is water and the particles are introduced at the top of the carrier liquid in water of a higher temperature than the carrier liquid.

References Cited
UNITED STATES PATENTS

| | | | |
|---|---|---|---|
| 775,965 | 11/1904 | Edison | 209—135 |
| 1,491,429 | 4/1924 | Stebbins | 209—135 |
| 1,842,372 | 1/1932 | Allison | 209—172 |
| 2,362,130 | 11/1944 | Glenn | 209—156 |
| 2,631,726 | 3/1953 | Auer | 209—172.5 X |
| 2,899,057 | 8/1959 | Menzies | 209—172.5 X |
| 2,929,502 | 3/1960 | Harris | 209—173 |
| 2,976,997 | 3/1961 | Miller | 209—454 |
| 3,249,219 | 5/1966 | Sanfilippo | 209—2 |
| 2,942,792 | 6/1960 | Anderson | 209—172.5 XR |

FRANK W. LUTTER, Primary Examiner

U.S. Cl. X.R.

209—135, 154